(12) United States Patent
Nevou et al.

(10) Patent No.: US 12,189,905 B2
(45) Date of Patent: Jan. 7, 2025

(54) BEHIND DISPLAY PROXIMITY SENSING

(71) Applicant: ams-OSRAM Asia Pacific Pte. Ltd., Singapore (SG)

(72) Inventors: Laurent Nevou, Eindhoven (NL); Jens Geiger, Eindhoven (NL); Ferran Suarez, Eindhoven (NL); Markus Rossi, Jona (CH)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 0 days.

(21) Appl. No.: 18/277,164

(22) PCT Filed: Feb. 7, 2022

(86) PCT No.: PCT/SG2022/050055
§ 371 (c)(1),
(2) Date: Aug. 14, 2023

(87) PCT Pub. No.: WO2022/173369
PCT Pub. Date: Aug. 18, 2022

(65) Prior Publication Data
US 2024/0134483 A1 Apr. 25, 2024
US 2024/0231542 A9 Jul. 11, 2024

Related U.S. Application Data

(60) Provisional application No. 63/149,448, filed on Feb. 15, 2021.

(51) Int. Cl.
*G06F 3/042* (2006.01)
*G01S 7/481* (2006.01)

(52) U.S. Cl.
CPC .......... *G06F 3/0421* (2013.01); *G01S 7/4811* (2013.01); *G06F 2203/04101* (2013.01)

(58) Field of Classification Search
CPC ......... G06F 3/0421; G06F 2203/04101; G01S 7/4811
See application file for complete search history.

(56) References Cited

U.S. PATENT DOCUMENTS

| 10,643,578 B2 * | 5/2020 | Zhou | G01S 17/003 |
| 2016/0216777 A1 * | 7/2016 | Geiger | G01D 5/34 |

(Continued)

FOREIGN PATENT DOCUMENTS

| JP | 5910796 B2 | 5/2016 |
| KR | 10-2011-0044431 A | 4/2011 |
| KR | 10-1641618 B1 | 7/2016 |

OTHER PUBLICATIONS

International Search Report issued on May 4, 2022, for corresponding International Patent Application No. PCT/SG2022/050055 (3 pages).

(Continued)

*Primary Examiner* — Sahlu Okebato
(74) *Attorney, Agent, or Firm* — VIERING, JENTSCHURA & PARTNER MBB

(57) ABSTRACT

An optical device includes a display and an optical sensor. The display includes display circuitry. The optical sensor is arranged behind the display. The optical sensor includes an emitter for emitting light through the display and a receiver for receiving light reflected back through the display. An absorption of the display is wavelength dependent and the absorption of the display is 50% at a first wavelength. The emitter is configured to emit light at a second wavelength greater than the first wavelength.

20 Claims, 6 Drawing Sheets

(56) References Cited

U.S. PATENT DOCUMENTS

2017/0185231 A1\* 6/2017 Russ .................. G06F 3/041
2018/0129328 A1 5/2018 Park et al.
2019/0331828 A1 10/2019 Mutlu et al.
2022/0262974 A1\* 8/2022 Lu .................... G01S 7/4814

OTHER PUBLICATIONS

Written Opinion issued on May 4, 2022, for corresponding International Patent Application No. PCT/SG2022/050055 (6 pages).

\* cited by examiner

BEHIND DISPLAY PROXIMITY SENSING

CROSS REFERENCE TO RELATED APPLICATION

This application is a National Stage of International Application No. PCT/SG2022/050055, filed on Feb. 7, 2022, which designates the United States and was published in English, and which claims priority to the U.S. Provisional Patent Application No. 63/149,448, filed on Feb. 15, 2021, in the United States Patent and Trademark Office. All of the aforementioned applications are hereby incorporated by reference in their entireties.

FIELD OF DISCLOSURE

The present disclosure relates to optical sensing and, particularly but not exclusively, to optical proximity sensing behind displays.

BACKGROUND

Proximity sensing, whereby the distance to an object is measured, is used in many modern electronic devices including mobile devices such as smartphones. For example, a proximity sensor in a smartphone can be used to detect when the user puts the phone to his ear, in response to which the display may be turned off.

Optical proximity detection typically measures the intensity of reflected light to determine the distance to an object. In conventional devices, the proximity sensor is located behind the cover glass of the device, somewhere adjacent to the display, the display being the printed board assembly comprising the light emitters (e.g. LEDs) of the display and the display circuitry to control the emitters.

There is a demand for displays which extend to the edges of the device. It may therefore be desirable to locate the proximity sensor behind the display. There are a number of problems associated with this solution:
 a) Low Signal-to-Noise ratio (SNR) due to the low transmission and high reflectance of the display;
 b) The color appearance of the display can get distorted when light is transmitted through the display;
 c) The conventional proximity sensors cannot determine the absolute distance to an object, because the signal is modulated by the unknown reflectance of the object.

The common strategy to solve a), the problem of low SNR, is to increase the illumination power, implement a large separation between the light emitter and the light receiver, which reduces the amount of crosstalk, and subtract the crosstalk on the receiver side. However, the increased power leads to increased power consumption and makes the problem of display distortion worse. Increasing the separation between emitter and receiver makes the sensor module larger, which is undesirable in mobile devices, and subtracting the crosstalk can be inaccurate.

The common strategy to solve b), the problem of display distortion, is to lower the illumination power or widen the illumination beam in order to lower the light power density. However, decreasing the power will lower the SNR, and a wider illumination beam requires either a higher module or an extra separation space between the module and the display for the beam to widen.

In summary, the problem of locating the proximity sensor behind the display is that the display performance is negatively affected by the sensor, and current strategies to mitigate this have a negative impact on the sensor SNR, which is already negatively impacted by the optical properties of the display.

Hence, it is an object of the present disclosure to address at least some of the problems identified in the prior art.

SUMMARY

The present disclosure relates to optical sensors (e.g. optical proximity sensors) and in particular to devices comprising a display where the sensor is located behind the display.

According to a first aspect of the present disclosure there is provided an optical device comprising a display comprising display circuitry (e.g. metal lines, vias etc.), and an optical sensor arranged behind the display. The optical sensor comprises an emitter for emitting light through the display and a receiver for receiving light reflected back through the display (the emitter and receiver may be the same entity). The absorption 30 of the display is wavelength dependent and the absorption of the display is 50% at a first wavelength. The emitter is configured to emit light at a second wavelength greater than the first wavelength. The first wavelength is the specific point at which the absorption of the display is 50%.

In particular, the absorption of the display may be less than 5% at the second wavelength.

The display (e.g. LED, OLED or μLED) will absorb and reflect a large part of the transmitted light. The absorption will depend on the material and thickness of the display, but also, importantly, on the wavelength of the light. The display will have an absorption spectrum, and the sensor emitter is therefore configured to operate at a longer wavelength (the second wavelength). Thereby, less light is absorbed and the SNR of the sensor can be improved for a device with a particular display.

The absorption spectrum of the display typically increases towards shorter wavelengths. For example, the absorption may increase continuously from 1100 nm to 300 nm. Hence, the transmissivity of the display at the light sensor wavelength can be greater than the display transmissivity in the absorption band range (e.g. below 1100 nm).

Preferably, to ensure a high transmission, the sensor wavelength emission is such that the absorption of the display for light at that wavelength is at least lower than 5%.

The display typically comprises a semiconductor material, wherein the absorption of the semiconductor material is wavelength and thickness dependent. The absorption of the display may be approximated by the absorption of a layer of the semiconductor material having the same thickness as the display. For example, the absorption of a 100 μm thick layer of the semiconductor material is 5% at a third wavelength, and the wavelength of the emitter (the second wavelength) may then be greater than the third wavelength. For example, the sensor emission wavelength may be such that a transmissivity of the semiconductor material having a thickness of 100 μm for light having the sensor emission wavelength is at least 95%. The semiconductor material is typically silicon but could also be GaAs or GaN for example.

Typically a display (e.g. a CMOS display) comprises silicon, which will be the major cause of light absorption in the display. Hence, the wavelength of the emitter can be chosen to be greater than the wavelength at which silicon has a high absorption 35 coefficient. For example, the emission wavelength can be chosen such that the absorption coefficient of silicon is lower than 1 cm$^{-1}$ for light with the emission wavelength. The wavelength dependence of the absorption (and hence the transmissivity) of silicon depends to some extent on the thickness of silicon, which is why a thickness of 100 µm is specified, which may be a typical thickness of a display in e.g. a smartphone. For many devices, the transmissivity for the display and the transmissivity of the semiconductor material of the display have the same or similar wavelength dependence.

The first wavelength is typically in the range of 400 nm to 1100 nm. Advantageously, the sensor emission wavelength may be above 1100 nm. For example, the second wavelength may be in the range of 1100 nm to 1600 nm. By using a non-visible light, having a wavelength over 1100 nm, display distortion can be eliminated or significantly reduced. The second wavelength may be at least 100 nm greater than the first wavelength.

The display is typically configured to display an image when in use and the emitter may be configured to emit light at the second wavelength with an intensity that does not distort the image. The long wavelength used may allow the light intensity of the emitter (i.e. the power) to be increased without having a negative impact on the display.

The sensor may be a proximity sensor for determining a distance to an object in front of the display, and/or for determining a velocity of the object. Preferably, the sensor is a self-mixing interference, SMI, sensor. SMI sensors can be very compact, and can be used for absolute distance and velocity measurements. SMI detection can be insensitive to background light, since SMI is wavelength-specific. Any incoherent light (such as background light) may only have a small effect on the SMI-based detection, in contrast to the coherent light from the emitter itself.

The SMI sensor can be configured for electrical detection (also referred to as electrical sensing), wherein the optical device is configured to monitor a voltage or a current input to the emitter of the SMI sensor. Electrical detection allows SMI detection without requiring a separate light sensor. Alternatively, the SMI sensor can be configured for optical detection (also referred to as optical sensing), wherein the optical device comprises a light detector for measuring the light intensity of light transmitted by the transmitter. Optical detection in SMI can be less noisy than electrical detection.

The emitter may be one of a vertical-cavity surface emitting laser, VCSEL, an edge emitter laser, EEL, and a quantum dots laser, QDL. For example, the emitter can be a GaAs based VCSEL. A VCSEL may be particularly suitable as it can be operated at long wavelengths such as 1150 nm or even 1200 nm, whilst also taking up very little space. The emitter may have an InGaAs, GaInNAs or GaInNAsSb quantum well.

Long wavelength VCSEL based on GINA (GaInNAs) or GINAS (GaInNAsSb) materials are particularly attractive when the emission wavelength has to be between 1200 nm and 1600 nm.

An optical device according to any one of the preceding claims, wherein the optical device is at least a part of one of a tablet, a smartphone, and a computer monitor. The device may be particularly beneficial for edge-to-edge display devices.

According to a second aspect of the present disclosure, there is provided a method of detecting an object in front of a display. The method comprises emitting light through the display and receiving light reflected back from the object and through the display. An absorption of the display is wavelength dependent and the absorption of the display is 50% at a first wavelength, The step of emitting light comprises emitting light having a wavelength greater than the first wavelength.

The absorption spectrum typically exhibits a step function, wherein the absorption drops rapidly above a certain wavelength. By using an emission wavelength greater than the wavelength where the absorption has dropped to 50%, the emission wavelength is typically after the step (i.e. at a longer wavelength).

Preferably, the light reflected back from the object is received in the emitter and causes a change in the emitter output, wherein the change in emitter output is measured to determine a distance or a velocity of the object. The change in emitter output can be measured by measuring a current or voltage input to the emitter. Alternatively, the change in emitter output can be measured by measuring a light intensity of light emitted by the emitter.

BRIEF DESCRIPTION OF THE PREFERRED EMBODIMENTS

Specific embodiments of the disclosure are described below with reference to the accompanying drawings, wherein FIG. 1 depicts an optical device according to an embodiment of the disclosure;

DETAILED DESCRIPTION

Figure 1:
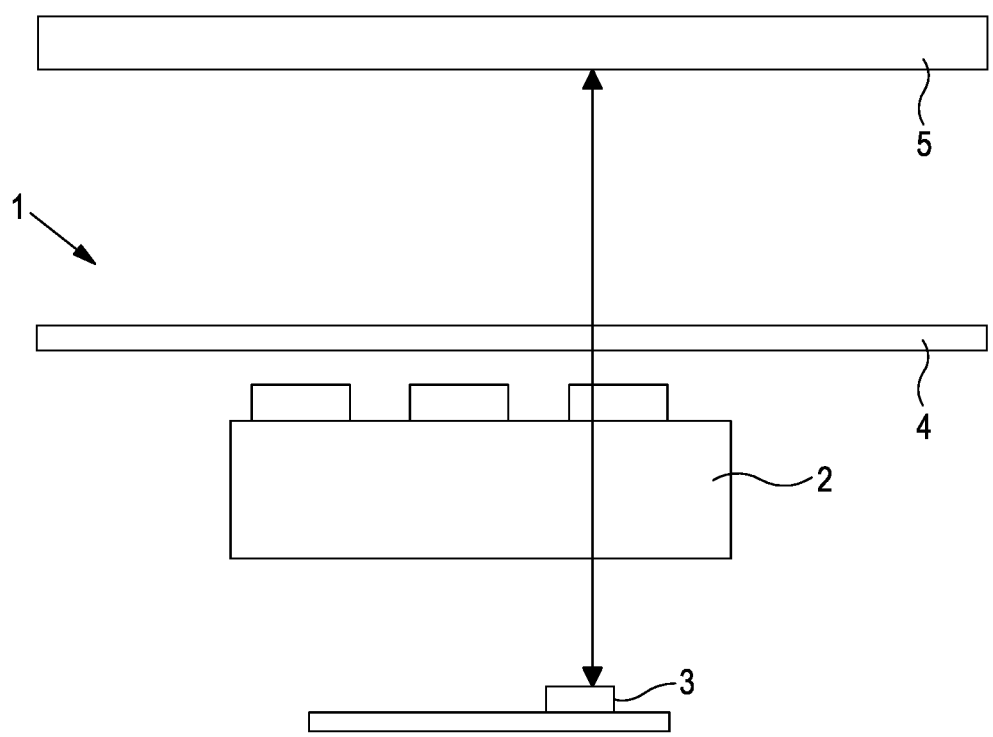

FIG. 1 shows a schematic diagram of an embodiment of an optical device 1. The device has a display 2 (e.g. a LED, OLED or µLED display) comprising display circuitry for controlling the display in order display an image. A proximity sensor 3 is located behind the display 2 and is configured the detect objects in front of the display 2. The device further comprises a cover glass 4 for protecting the display 2. In use, the proximity sensor 3 emits light that is transmitted through the display 2 and through the cover glass 4. The light is reflected from an object 5 in front of the cover glass. The reflected light is transmitted back through the cover glass 4, through the display 2 and back to the sensor 3. The received light is used to detect the object 5 (e.g. to measure the distance and/or velocity to the object).

The display 2 is typically made from silicon and comprises metal circuitry (e.g. copper metal lines and vias). The metal circuitry causes a large portion of light to be reflected from the display 2, thereby decreasing the overall transmission. In addition, the silicon material will absorb a portion of the light, depending on the wavelength of the light. Overall, the transmissivity of the display 2 may be around 5%, i.e. only about 5% of the light emitted from the sensor 3 is transmitted through the display 2. This loss of light occurs both as the light is transmitted out of the device 1 and as it is reflected back through the display 2 to the sensor 3.

Hence, a high light intensity may be required for sufficient light to be reflected back to the sensor 3. However, the display 2 can be disturbed by the high light intensity. For example, the intensity of pixels in the display 2 change and black spots may form upon irradiation with high intensity. To mitigate this, the sensor 3 is configured to use a long wavelength sufficiently far away from the visible spectrum. With a suitably long wavelength, the display 2 is not disturbed or only marginally disturbed. For a silicon based display 2, the sensor 3 may be configured to emit light having a wavelength above 1100 nm.

Figure 5A:
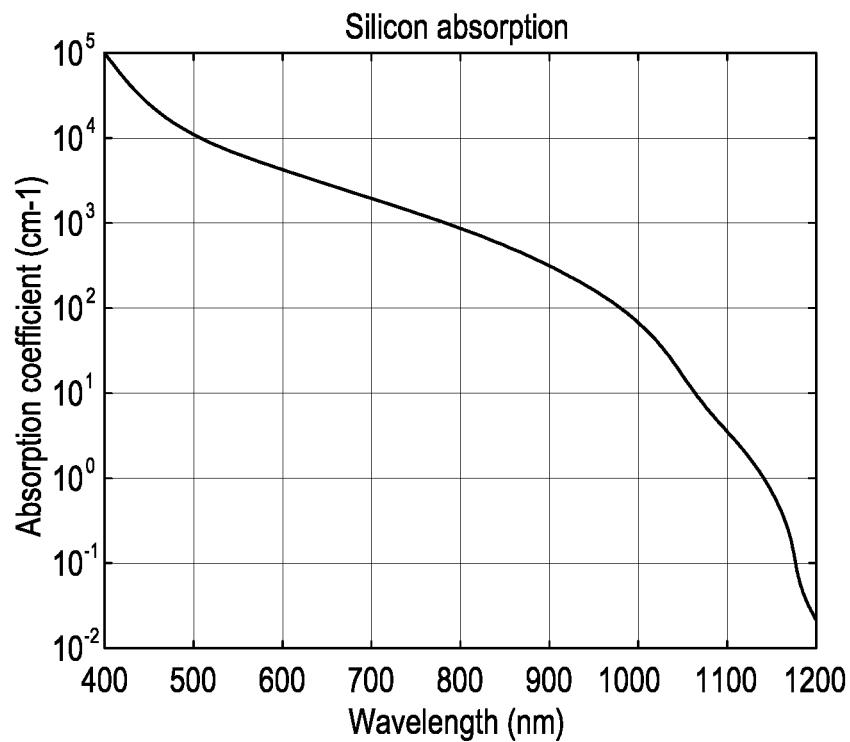
FIG. 5a depicts a graph showing the spectral absorption coefficient of Silicon.
Figure 5B:
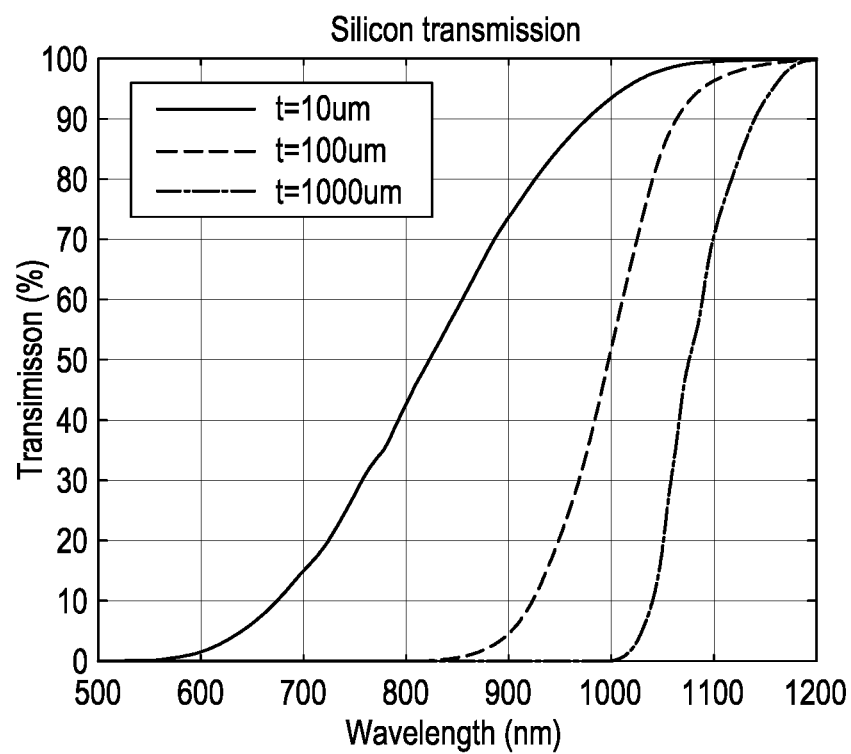
FIG. 5b depicts a graph showing the spectral transmission of Silicon for various thicknesses.

Due to the absorption spectrum of the display material (e.g. silicon) (see FIG. 5*a*), the display 2 will have a wavelength dependent transmissivity (see FIG. 5*b*). Typically, the display will have a low transmissivity for wavelength shorter than 1000 nm (depending on the display material and thickness), and the sensor 3 is configured to operate at a longer wavelength. Hence, the long wavelength used by the sensor 3 both increases the transmission (and thereby SNR) and reduces the risk of display distortion.

The minimum (or reduced) transmissivity of the display generally corresponds to the maximum absorption of the display, since the reflectivity from the display circuitry is largely wavelength-independent. The sensor 3 may be configured to operate at a wavelength where the absorption of the display is at most 5% in absolute value. This may be, for example, at a wavelength at least 100 nm or at least 200 nm above the wavelength where the absorption transition step occurs (FIG. 5*a*). For example, if the absorption step of the display occurs around 950 nm, then the sensor 3 can be configured to operate at 1050 nm or more.

The proximity sensor 3 comprises an emitter being a laser, such as a VCSEL, EEL, or QDLs. A GaAs-based laser (e.g., VCSEL) works well up to about 1150 nm or 1200 nm.

GaInNAs-based laser (e.g. VCSEL) technologies can be fabricated on GaAs substrates for longer wavelengths above 1200 nm or 1400 nm or even higher, but typical power conversion efficiencies are lower than in traditional GaAs based VCSELs with and InGaAs quantum well.

GaInNAsSb-based laser (e.g. VCSEL) technologies can also be fabricated on GaAs substrates for longer wavelengths above 1200 nm or 1400 nm or higher, but this decreases its power conversion efficiency.

The sensor 3 may be a SMI sensor, wherein the emitter and receiver of the sensor 3 is the same, and the sensor 3 is arranged such that light is reflected back into the emitter. The emitter comprises a resonator (e.g. the laser cavity in a VCSEL). In the resonator, coherent mixing occurs with light generated by the emitter with light reflected back from the object 5 into the emitter (i.e. there is interference between the light directly generated in the emitter and the light reflected back into the emitter). This affects the emitter output and the emitted light depends on the coherent mixing. Hence, the emitter output (or a related parameter) can be used to determine the distance and/or velocity to the object 5. For example, the supply signal (i.e. the input voltage or current) to the emitter may be used as a parameter to detect the object 5. Alternatively, optical detection may be used, wherein the intensity of the emitted light is directly measured with a light detector for determining the distance/velocity.

For SMI detection, light is emitted from an emitter being a resonant light source (i.e. having an optical resonator in which the light circulates), e.g. a laser, and a portion of the light leaving the resonator is fed back into the resonator a, e.g., after the light has interacted with an object by, e.g., reflection or scattering. The feed-back light interacts with the light in the resonator and introduces a disturbance in the light source by interference. This effect can be sensed and can be related to the interaction with the object, such as the distance to the object or a velocity of the object (relative to the light source/resonator exit mirror). Sensing can be accomplished optically, wherein the emitted light intensity is monitored, e.g., using a photodiode. For example, a beam splitter can be positioned close to the exit mirror to let most of the light exiting the exit mirror pass and reflect a small portion to a photo detector. Alternatively, the other mirror of the resonator can be made partially transmissive (e.g., 99% instead of 100% reflective), and the light detector is positioned close that mirror. This can be a more compact solution than using a beam splitter. Alternatively, sensing can be accomplished electrically, wherein a feed signal for the light source is monitored. For example, if the light source is driven with constant current, and the change in voltage is determined. If the light source is driven with a constant voltage, then change in current is determined instead. The electrical signal may be noisier than the optically obtained signal.

Using SMI-based sensing can eliminate the need for a detector that is sensitive at the optical wavelength, since the light is received back by the laser. This also avoids the loss of SNR by using a detector at the edge of its wavelength range, or adding a non-silicon detector for detection of the long wavelength.

In addition, the SMI-based sensors can be very small, which is important for application in mobile devices such as smartphones and smartwatches. SMI-based detection is also very insensitive to background light, and enables absolute distance and/or velocity measurements.

While optical detection for SMI may provide accurate results, for long wavelengths from above about 1100 nm or 1150 nm, light detectors which are based on a different semiconductor material may be required (e.g., InGaAs, GaInNAs, GaInNAsSb or Ge), which can increase the complexity and cost of the device 1.

Hence, electrical detection for SMI may be advantageous. It enables a smaller form factor (as no additional light detector is required) and avoids the problems which can arise from having to detect light having relatively long wavelengths, such as above 1100 nm (e.g. problems of increased costs and selection of semiconductor materials which are more difficult to handle than, e.g., Si)

Reflections from the display 2 and/or the cover glass 4 back into the emitter may be problematic for SMI detection. However, due to the relative short distance between the display/cover glass and the sensor 3, compared to the distance to the object 5, the signal reflected from the display/cover glass can be filtered out from the signal reflected from the object 5. To further reduce the amount of reflections from the display/cover glass, a lens, which focuses the light outside the cover glass 4 (closer to the object 5) may be used. Alternative or in addition, the emitter may be tilted (e.g. by 1 to 3 degrees) off the vertical axis to avoid mirror reflections back from the display/cover glass. Light reflected from the object 5 will tend to be more diffuse, and is therefore less impacted by the tilted emitter.

The proximity sensor 3 may be used to simply indicate the presence of an object within a certain distance threshold, rather than being used to measure the absolute distance to that object.

Figure 2:
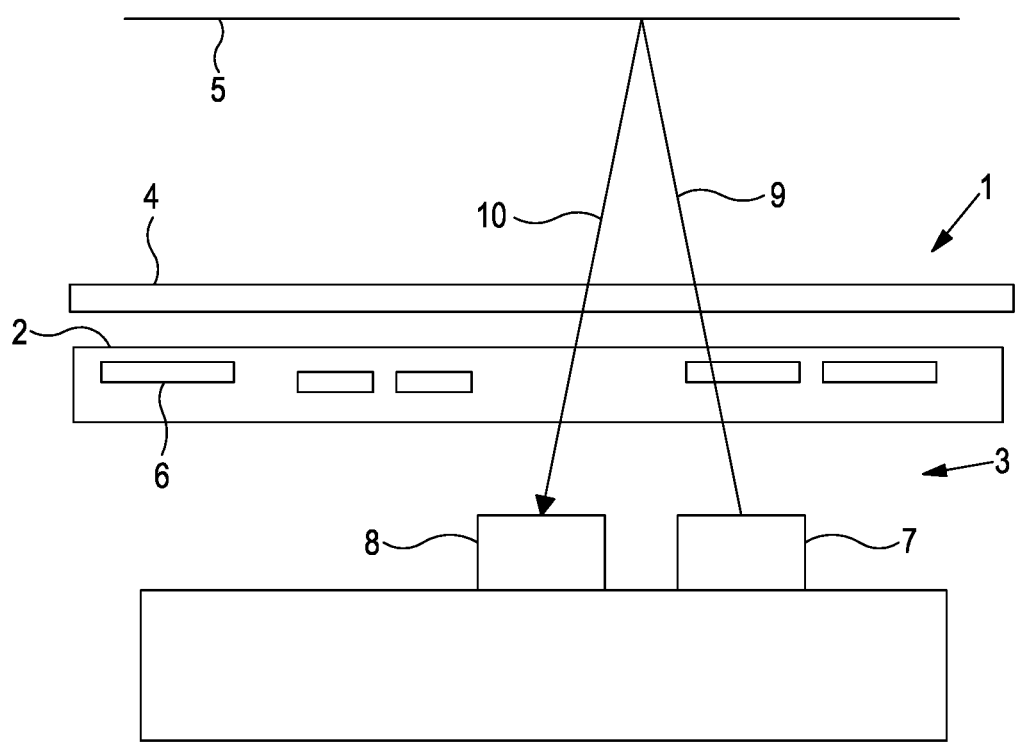
FIG. 2 depicts an embodiment of the optical device having a separate emitter and receiver.

FIG. 2 shows a schematic diagram of an embodiment of an optical device 1, which may be the optical device 1 of FIG. 1. Similar or equivalent features of embodiments in different figures have been given the same reference numerals to aid understanding and are not intended to limit the illustrated embodiments. The optical device 1 comprises a display 2 having display circuitry 6 (e.g. metal lines for connecting to display pixels), a cover glass 4, and an optical sensor 3 comprising an emitter 7 and a receiver 8. The emitter 7 emits light 9 that is transmitted through the display 2 and reflects off an object 5. The reflected light 10 is transmitted through the display 2 and into the receiver 8. Time of flight (TOF) or intensity measurements may be used to detect the object 5.

Figure 3:
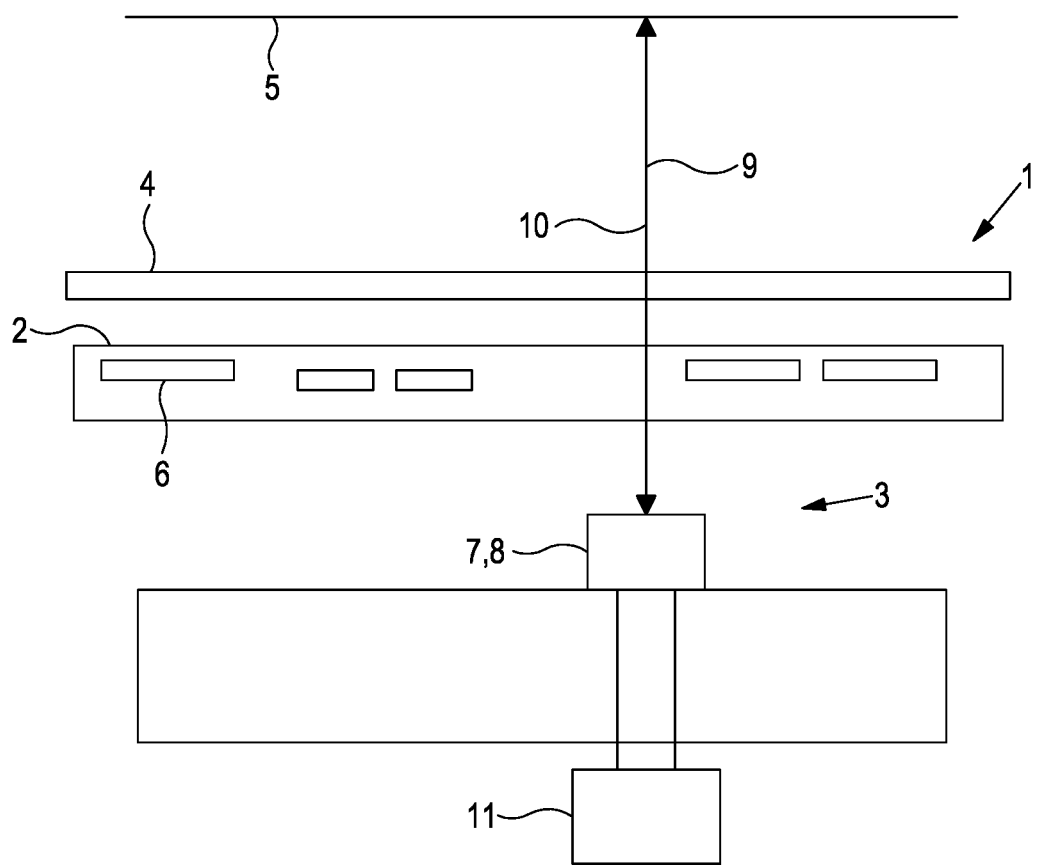
FIG. 3 depicts another embodiment of the optical device having a self-mixing interference (SMI) sensor and an electrical detection module.

FIG. 3 shows another embodiment of an optical device 1 which may be the optical device 1 of FIG. 1 when using an SMI sensor 3. The optical device 1 comprises a display 2 having display circuitry 6, a cover glass 4, and an optical sensor 3 comprising an emitter 7 being a laser (e.g. a VCSEL) and also being the receiver 8 of the sensor 3. The emitter 7 emits light 9 that is transmitted through the display 2 and reflects off an object 5. The reflected light 10 is transmitted through the display 2 and into the receiver 8. The sensor 3 further comprises an electrical detection module 11, which is used to measure the input voltage and/or input current to the emitter 7. The measured current or voltage is indicative of the interference of light inside the laser, and can be used to detect the object. For example, the absolute distance and/or velocity of the object can be determined from the measured voltage or current.

This may be a particularly useful embodiment, wherein the long wavelength (e.g. λ>1100 nm) of the emitter 7 for higher transmission and less display distortion/disturbance is combined with SMI, which does not require a separate detector that is capable of detecting the long wavelengths.

Figure 4:
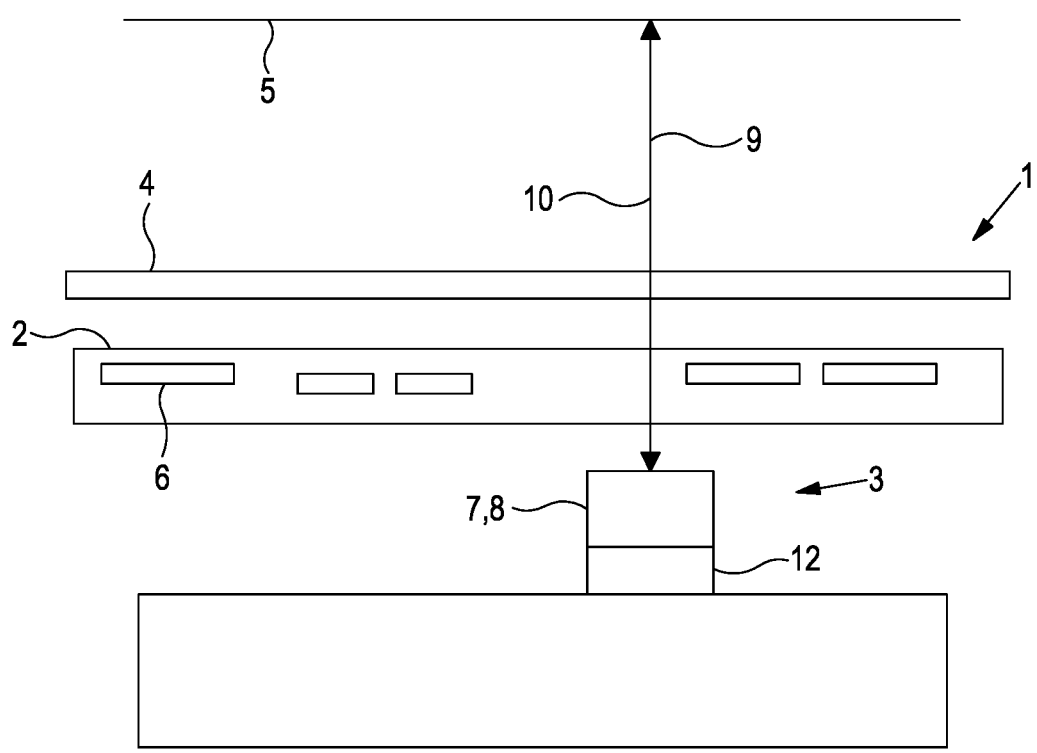
FIG. 4 depicts another embodiment of the optical device having a SMI sensor, wherein optical sensing is used.

FIG. 4 shows another embodiment of an optical device 1 which may be the optical device 1 of FIG. 1 when using an SMI sensor 3. The optical device 1 is similar to that of FIG. 3, but instead of using an electrical detection module, a separate light detector 12 is used to measure the light intensity from the emitter 7 of the sensor 3. The object 5 can be detected by the measured intensity.

FIG. 5a shows the absorption coefficient of Silicon in the range of 300 nm to 1200 nm. The absorption is strongly increasing towards shorter wavelengths (logarithmic scale). From the graph, any Silicon thickness transmission T can be computed with the following expression: $T=\exp(-\alpha^* t)$, where a is the absorption coefficient and t is the Silicon thickness (this expression is not taking into account the refractive index).

FIG. 5b shows the transmission spectra of Silicon computed from the absorption coefficient (FIG. 5a) for various thicknesses (10 μm, 100 μm and 1000 μm). One can see that for a Silicon thickness of 100 μm, wavelengths above 1100 nm may be suitable for use in the disclosed device.

Figure 6:
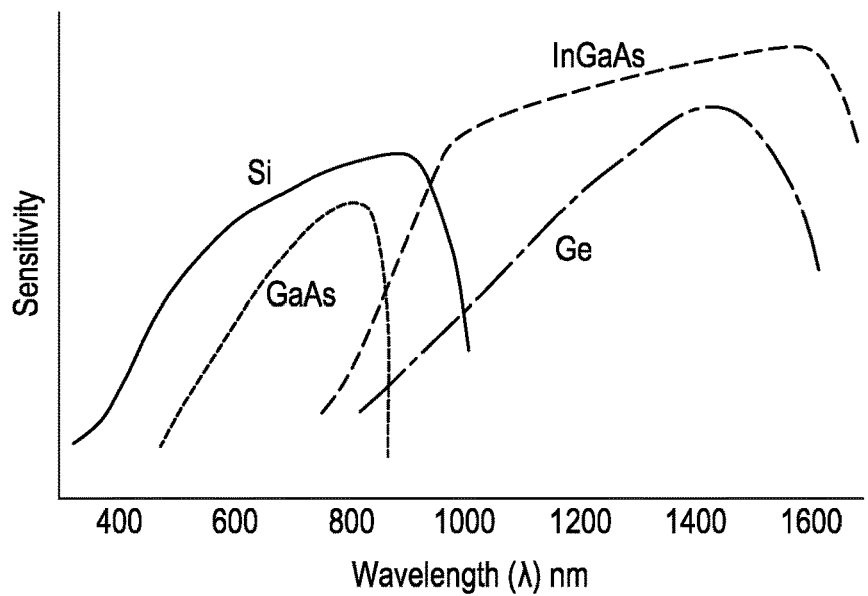
FIG. 6 depicts another graph showing the sensitivity to light of different semiconductor materials as a function of wavelength.

FIG. 6 shows the sensitivity of different semiconductor materials to light as a function of wavelength. The sensitivity relates to the absorption of light, since light that is transmitted through the material cannot be sensed. As can be seen from the graph, GaAs has a maximum sensitivity at a lower wavelength (around 800 nm) compared to silicon. Hence, if a device with a display based on GaAs is used, the proximity sensor may be operated at a lower wavelength. The wavelength should be chosen such that it is longer than the wavelength at which the maximum sensitivity of the display material occurs.

Figure 7:
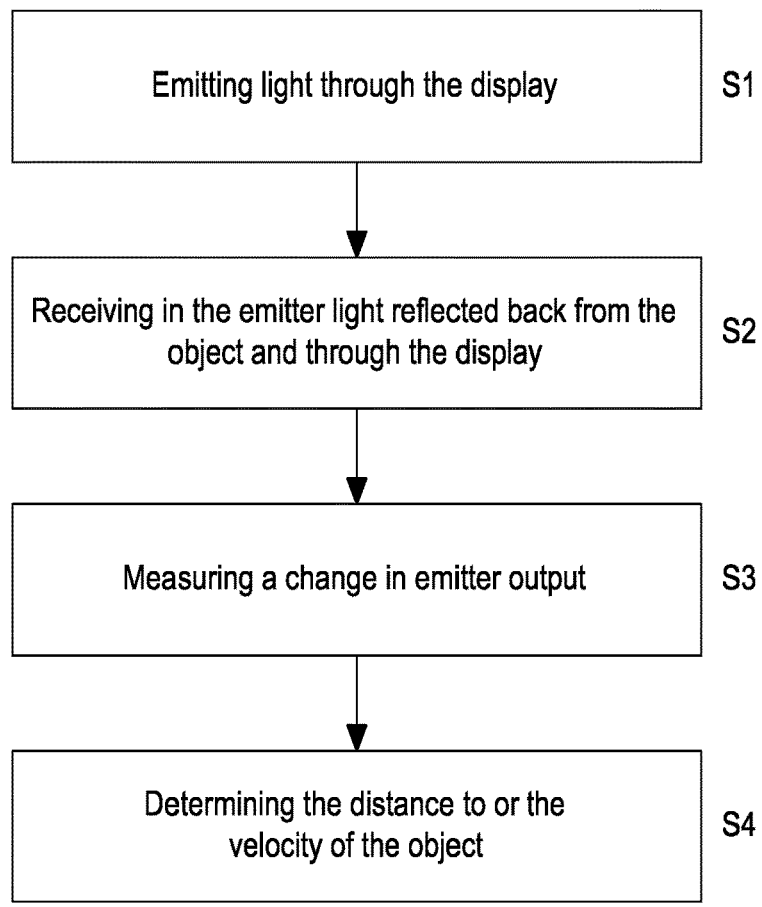
FIG. 7 depicts a flow diagram of a method according to an embodiment of the disclosure.

FIG. 7 is a flow diagram showing the steps of a method proximity detection in order to determine the distance to or velocity of an object in front of a display. The method may be carried out using an optical device as described above (e.g. the optical device 1 of FIG. 1). The method comprises emitting light though the display (step S1), and receiving in the emitter light reflected back from the object and through the display (step S2). The method further comprises measuring a change in the emitter output (step S3) and, using the measured change, determining the distance to or velocity of the object (step S4). The change may be inferred or determined from the electrical (voltage or current) input to the emitter.

Although the aforementioned description uses a proximity sensor for the behind display sensing, it will be understood by the skilled person that any other optical sensing device can be equally used instead of the proximity sensor and the alternative arrangement would still be within the scope of the claimed disclosure.

Although specific embodiment have been described above, the claims are not limited to those embodiments. Each feature disclosed may be incorporated in any of the described embodiments, alone or in an appropriate combination with other features disclosed herein.

| Reference Numerals |
| --- |
| 1 Optical Device |
| 2 Display |
| 3 Sensor |
| 4 Cover glass |
| 5 Object |
| 6 Display circuitry |
| 7 Emitter |
| 8 Receiver |
| 9 Emitted light |
| 10 Reflected light |
| 11 Electrical detection module |
| 12 Light detector |

The invention claimed is:

1. An optical device comprising:
a display comprising light-emitting elements and display circuitry configured to control the light-emitting elements;
an optical sensor arranged behind the display, the optical sensor comprising an emitter configured to emit light through the display to an object in front of the display and a receiver configured to receive light reflected from the object back through the display;
wherein an absorption of the display is wavelength dependent and the absorption of the display for light having a first wavelength is 50%, and the emitter is configured to emit light at a second wavelength greater than the first wavelength,
wherein the sensor is configured to determine a proximity of the object, a distance to the object and/or a velocity of the object.

2. The optical device according to claim 1, wherein the second wavelength is such that the absorption of the display for light having the second wavelength is less than 5%.

3. The optical device according to claim 1, wherein the display comprises a semiconductor material, wherein an absorption of the semiconductor material is wavelength dependent and the semiconductor material having a thickness of 100 μm has an absorption of 5% for light at a third wavelength, and wherein the second wavelength is greater than the third wavelength.

4. The optical device according to claim 3, wherein the second wavelength is such that a transmissivity of the semiconductor material having the thickness of 100 μm is at least 95% for light having the second wavelength.

5. The optical device according to claim 3, wherein the semiconductor material is silicon.

6. The optical device according to claim 1, wherein the first wavelength is in the range of 300 nm to 1000 nm.

7. The optical device according to claim 1, wherein the second wavelength is greater than 1100 nm.

8. The optical device according to claim 1, wherein the second wavelength is at least 100 nm greater than the first wavelength.

9. The optical device according to claim 1, wherein the display is configured to display an image when in use and the emitter is configured to emit light at the second wavelength with an intensity that does not distort the image.

10. The optical device according to claim 1, wherein the sensor is a self-mixing interference (SMI) sensor, wherein the emitter is also the receiver.

11. The optical device according to claim 10, wherein the SMI sensor is configured for electrical detection, wherein the optical device is configured to monitor a voltage or a current input to the emitter of the SMI sensor.

12. The optical device according to claim 10 wherein the SMI sensor is configured for optical detection, wherein the optical device comprises a light detector for measuring the light intensity of light transmitted by the transmitter.

13. The optical device according to claim 1, wherein the emitter is one of a vertical-cavity surface emitting laser (VCSEL), an edge emitter laser (EEL), and a quantum dots laser (QDLL).

14. The optical device according to claim 13, wherein the emitter is a GaAs based VCSEL.

15. The optical device according to claim 13, wherein the emitter has an InGaAs, GaInNAs or GaInNAsSb quantum well.

16. A method of detecting an object in front of a display, the method comprising:
    emitting light through the display to the object, the display including light-emitting elements and display circuitry configured to control the light-emitting elements;
    receiving light reflected back from the object and through the display, wherein an absorption of the display is wavelength dependent and the absorption of the display for light having a first wavelength is 50%, and the step of emitting light comprises emitting light having a second wavelength greater than the first wavelength; and
    determining a proximity of the object, a distance to the object and/or a velocity of the object.

17. The method according to claim 16, wherein the light reflected back from the object is received in the emitter and causes a change in the emitter output, wherein the change in emitter output is measured to determine a distance to or a velocity of the object.

18. The method according to claim 17, wherein the change in emitter output is measured by measuring a current or voltage input to the emitter, or by measuring a light intensity of light emitted by the emitter.

19. The optical device according to claim 1, wherein the optical sensor is further configured to filter out a light reflected from the display from the light reflected from the object.

20. The optical device according to claim 1, further comprising a lens configured to focus the light emitted from the emitter at a point in front of the display nearer to the object.

* * * * *